United States Patent [19]
Brockelsby et al.

[11] Patent Number: 5,164,732
[45] Date of Patent: Nov. 17, 1992

[54] HIGHWAY VEHICLE IDENTIFICATION SYSTEM WITH HIGH GAIN ANTENNA

[75] Inventors: William K. Brockelsby; Conrad M. B. Walker; Michael L. Hryciuk; Donald P. Gillis, all of Edmonton, Canada

[73] Assignee: EID Electronic Identification Systems Ltd., Montreal, Canada

[21] Appl. No.: 446,234

[22] Filed: Dec. 5, 1989

Related U.S. Application Data

[63] Continuation-in-part of Ser. No. 383,169, Jul. 20, 1989, Pat. No. 4,937,581, which is a continuation of Ser. No. 195,400, May 13, 1988, Pat. No. 4,870,419, which is a continuation of Ser. No. 661,712, Oct. 7, 1984, abandoned, which is a continuation-in-part of Ser. No. 536,010, Sep. 26, 1983, abandoned, which is a continuation-in-part of Ser. No. 234,570, Feb. 13, 1981, abandoned.

[51] Int. Cl.⁵ .................... G01S 13/74; G01S 13/80
[52] U.S. Cl. ........................ 342/44; 342/45; 342/50; 342/51; 340/505; 340/825.54; 340/933; 340/935; 340/988; 235/384
[58] Field of Search .......... 343/719, 711, 717, 770, 343/771, 789, 826, 827, 834, 837, 841, 847, 873; 342/42-45, 50, 51; 235/384; 340/505, 825.54, 933, 935, 941, 988

[56] References Cited

U.S. PATENT DOCUMENTS

| | | | |
|---|---|---|---|
| 3,163,860 | 12/1964 | Bailey | 342/44 |
| 3,290,675 | 12/1966 | Neild | 340/825.34 |
| 3,346,842 | 10/1967 | Dixon | 340/933 |
| 3,346,864 | 10/1967 | Harmon | 343/719 |
| 3,530,434 | 9/1970 | Stites et al. | 340/825.61 |
| 3,594,798 | 7/1971 | Leydorf et al. | 343/719 |
| 3,626,413 | 12/1971 | Zachmann | 340/933 X |
| 3,691,488 | 9/1972 | Holtum, Jr. | 333/232 |
| 3,713,148 | 1/1973 | Cardullo et al. | 342/44 |
| 3,750,163 | 7/1978 | Hecker | 342/45 |
| 3,772,668 | 11/1973 | Smith | 340/825.54 |
| 3,798,641 | 3/1974 | Preti | 342/44 |
| 3,803,616 | 4/1974 | Kopf et al. | 343/719 |
| 3,813,658 | 5/1974 | Rich, Jr. | 235/449 |
| 3,813,659 | 5/1974 | Charlton | 235/449 |
| 3,816,708 | 6/1974 | Walton | 340/825.3 |
| 3,839,717 | 10/1974 | Paul | 342/44 |
| 3,914,762 | 10/1975 | Klensch | 342/44 |
| 3,918,057 | 11/1975 | Van Tol | 342/51 |
| 3,935,432 | 1/1976 | Maynard | 235/465 |
| 3,984,835 | 10/1976 | Kaplan et al. | 342/44 |
| 4,002,889 | 1/1977 | Hoyer-Ellefsen | 235/487 |
| 4,015,259 | 3/1977 | Siverhus et al. | 342/44 |
| 4,068,211 | 1/1978 | Van Tol | 340/933 |
| 4,075,632 | 2/1978 | Baldwin | 342/51 |
| 4,104,630 | 8/1978 | Chasek | 342/44 |
| 4,114,151 | 9/1978 | Denne et al. | 342/44 |
| 4,167,007 | 9/1979 | McGeoch et al. | 342/44 |
| 4,209,783 | 6/1989 | Ohyama et al. | 340/825 |
| 4,687,445 | 8/1987 | Williams | 343/719 |

OTHER PUBLICATIONS

Report entitled, "Heavy Vehicle Electronic License Plate Program–AVI Test Program–Interim Report and Recommendations" by Castle Rock Consultants.
Report entitled, "Heavy Vehicle Electronic License Plate (HELP) Program–Automatic Vehicle Identification (AVI) Research and Development Project Final Report", dated Mar. 1990 by Castle Rock Consultants.
"Handbook of Microprocessors, Microcomputers, and Minicomputers", John D. Lenk, Prentice-Hall, Inc., 1979, pp. 51, 52 and 280.

*Primary Examiner*—Bernarr E. Gregory
*Attorney, Agent, or Firm*—Fitch, Even, Tabin & Flannery

[57] ABSTRACT

An antenna system for mounting in a roadway comprised of an electrically lossy material. The antenna system has a reflector trough shield filled with a solid dielectric. An antenna, preferably comprised of coaxial cable, is positioned in the reflector trough, which prevents electromagnetic waves radiated by the antenna from being lost into the roadway.

22 Claims, 7 Drawing Sheets

DATA RECEIVER DETAIL

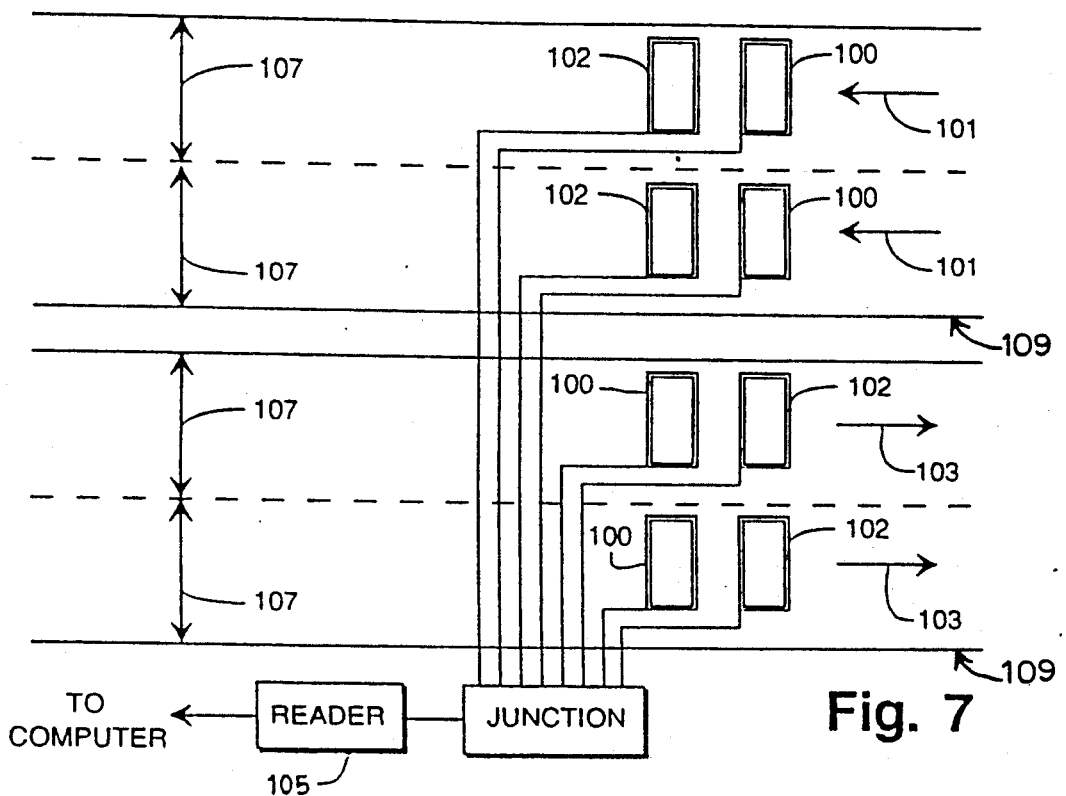
Fig. 7
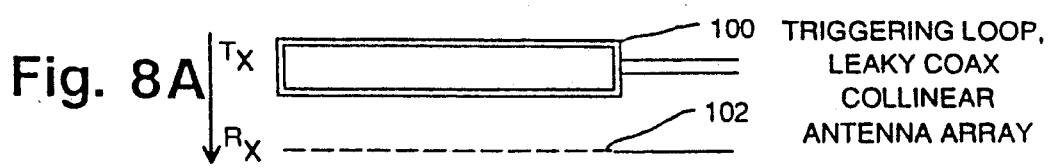
Fig. 8A — TRIGGERING LOOP, LEAKY COAX COLLINEAR ANTENNA ARRAY
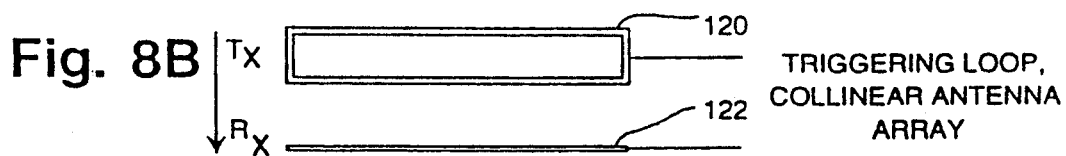
Fig. 8B — TRIGGERING LOOP, COLLINEAR ANTENNA ARRAY
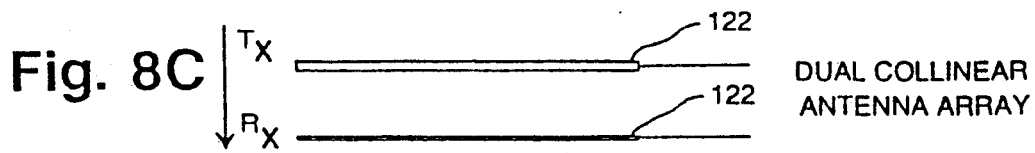
Fig. 8C — DUAL COLLINEAR ANTENNA ARRAY
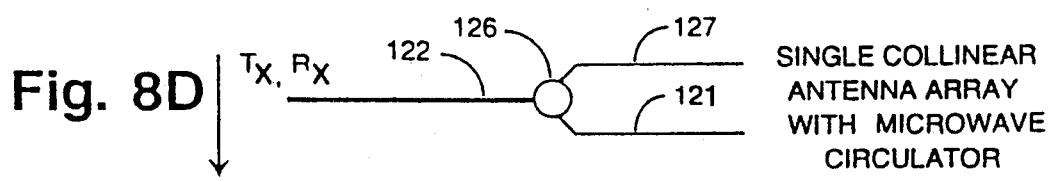
Fig. 8D — SINGLE COLLINEAR ANTENNA ARRAY WITH MICROWAVE CIRCULATOR

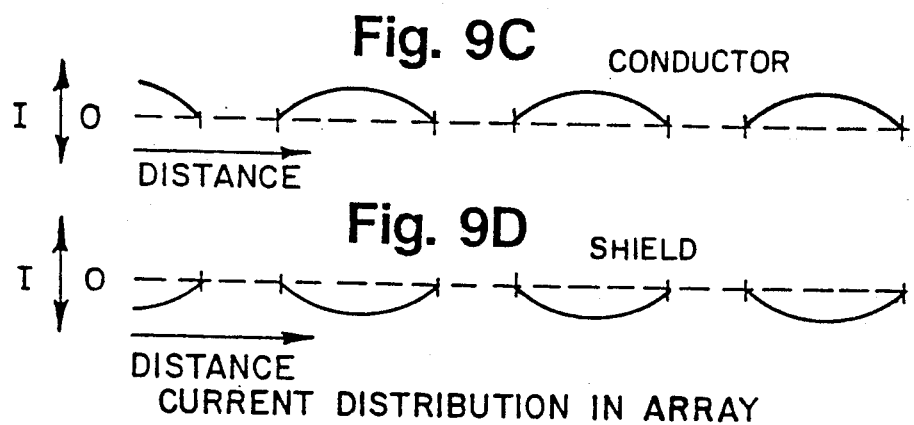
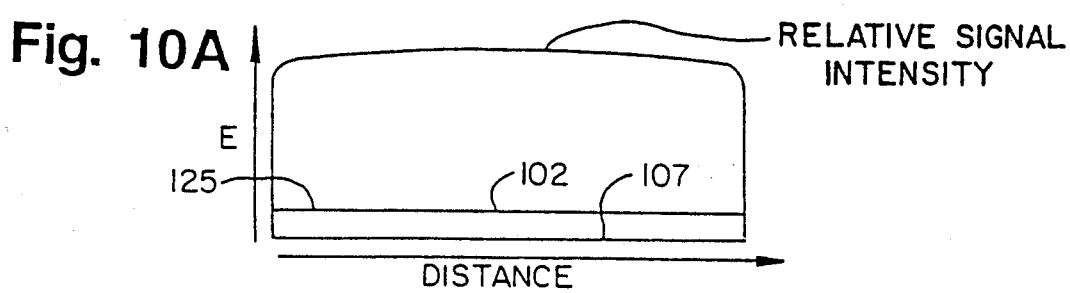
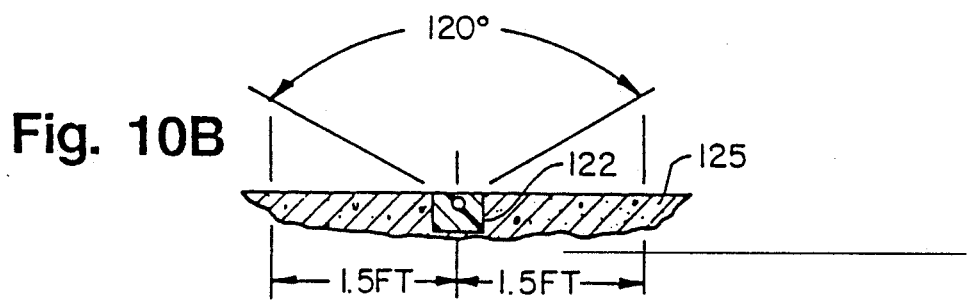
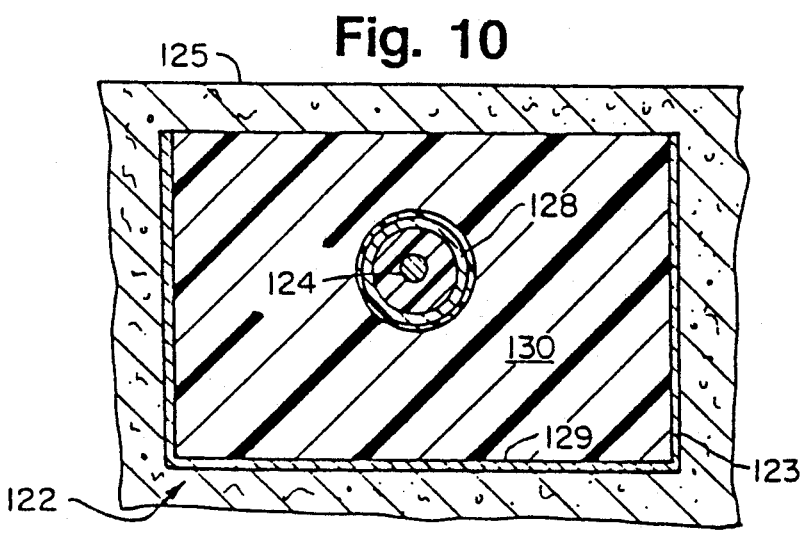

HIGHWAY VEHICLE IDENTIFICATION SYSTEM WITH HIGH GAIN ANTENNA

CROSS REFERENCES TO RELATED APPLICATIONS

This is a continuation-in-part of co-pending application Ser. No. 383,169, filed Jul. 20, 1989, to Baldwin et al. for Electronic Identification System, and assigned to the present assignee, now U.S. Pat. No. 4,937,581, which is a continuation of Ser. No. 195,400, filed May 13, 1988, to Baldwin et al. for Electronic Identification System, and assigned to the present assignee, now U.S. Pat. No. 4,870,491, which is a continuation of application Ser. No. 661,712, filed Oct. 17, 1984, to Baldwin et al. for Electronic Identification System, assigned to the present assignee and now abandoned; which is a continuation-in-part of application Ser. No. 536,010, filed Sep. 26, 1983, to Baldwin et al., for Electronic Identification System, assigned to the present assignee and now abandoned; which is a continuation-in-part of application Ser. No. 234,570, filed Feb. 13 1981, to Baldwin et al. for Electronic Identification System, assigned to the present assignee and now abandoned.

BACKGROUND OF THE INVENTION

The invention relates to an identification system suitable for identifying objects from a remote interrogation station. More specifically, the invention provides an electronic identification device including a logic circuit and a memory, a trigger circuit and a transmitter positioned on an object and a remote interrogation station including a receiver and data processor, together with means for remotely programming the electronic identification device with transit information when the object is moving relative to the interrogation station. The invention also includes a system and apparatus for identifying vehicles traveling along multi-lane bidirectional highways by using a roadway antenna connected to the receiver of the remote interrogation station. The roadway antenna comprises an antenna array traversing the highway lanes, and includes a collinear antenna array positioned in a reflector shield filled with a dielectric and buried in a flush-mount relationship with the roadway surface.

There is a need for an identification system wherein moving objects such as railroad cars, passing an interrogation station, identify themselves for both accounting and control purposes. Such a system would also be applicable to boats, trucks, shipping containers, mail bags, pallets, etc. As well as these commercial applications, there is also a need for an identification system for monitoring animals in their natural habitat, including both fish and birds. The system could be applicable for identification of humans, for control and security purposes, the identification of livestock, and many other uses. In addition to the above uses, the ability to read, write, delete or modify data in a digital form makes the system applicable to a variety of uses, an example of which is a credit card. In this case, the system serves as a portable interrogable memory for information such as a credit balance.

The complexity of modern transportation systems has increased to the point where automated traffic management has become essential for efficient operation. This is true of railways, highway truck transportation, urban transit systems, mining and logging operations, livestock management, and even factory personnel, to name but a few. Early attempts to meet these needs followed the premise that all that was necessary was to identify the individual vehicles automatically and all other management functions could then be carried out in a central computer. This notion belies the fact that a vast amount of data communications with a central data base are then required. In many cases, particularly when operations cover a large geographic area, this approach is both expensive and impractical. In addition, initial encoding of earlier devices was not satisfactory. The device was either factory-programmed, requiring a cross-reference table to relate the arbitrary number to that of the vehicle, or it was field-programmed by physical and/or electric contact, requiring sealing in the field to ensure package integrity.

What is needed is a transponder system having a high gain antenna but with broad transverse coverage to ensure that transponder communication can take place between an interrogation station and an information and identity storage system carried by a highway vehicle.

SUMMARY OF THE INVENTION

The present invention provides an electronic identification system that can store both fixed and changing information on a moving object, such as a railroad car, without physical contact and while the object is moving at relatively high speeds. Furthermore, a portion of the information stored on the object can be protected from accidental erasure so that portion cannot be changed without further steps being taken.

In the case of a railroad car, the system provides the car's identity and other pertinent information relating to the car. Some of the information is protected from erasure, such as the identification number, the type of car and loading limits. Other information, such as destination, contents, special handling considerations, etc., can be reprogrammed remotely by an interrogation station.

To provide for high speed transmission of information, a memory that can be read and changed and has a number of separate pages to store information is located on the object. Different interrogation stations can then be placed to send encoded interrogation signals to read individual pages of information. Some pages may be protected from erasure as they contain fixed information, while other pages may be remotely changed as desired. By utilizing separate pages in the memory, and more than one interrogation station, more information can be gathered in a shorter space of time, thus allowing higher relative speeds between the object and the interrogation station. The information gathered by the interrogation stations may be transmitted in a computer-compatible format for storage and transmission by existing data communication systems.

Another use for the system is to place electronic identification devices along the path, such as a railroad track, road or highway, and install an interrogation station on a moving vehicle, such as a railroad train, automobile or truck. The electronic identification system of the present invention has an information and identity storage device including a logic circuit and memory, trigger circuit and a transmitter located on the object, with the trigger circuit operating on low power. Upon being triggered by a signal from a remote interrogation station, the transmitter transmits the data into memory in a short series of transmissions. Power for the transmitter is provided by battery but can include other sources of power, such as an inertial generator, electromagnetic generation, induction, visible or infrared light, or by combinations of these power sources. Moving objects can generate power for the transmitter from movement or vibration in a gravitational field. This technique can also be used to extend the life of the battery.

The interrogation station, as well as sending a signal to trigger the trigger circuit, also has a pulse sequence generator to program the memory on the object and a receiver to receive the data from the memory on the object.

The use of an absolute time source in the information and identity storage device provides for synchronization between the transmitter and the receiver and allows the use of a non-return to zero (NRZ) code format. Alternatively, a free running clock can be used in the system and synchronization can be effected by choice of a suitable code format and appropriate processing in the decoding unit.

This system has the additional advantage of allowing the clock oscillator to be gated off between interrogations with further savings in quiescent power consumption The data transfer rate for the transmitter should be sufficient to allow for the relative velocity between the object to be identified and the interrogation station.

In one embodiment, the memory bank associated with the information and identity storage device on the vehicle stores two hundred fifty six bits divided into four sixty four bit pages. The first page could contain the most important information including the identity of the vehicle and can be read at speeds of up to 320 km./hr. (160 m.p.h.). The other pages can be read by the same interrogation station at lower speeds. Thirty four bits of the first sixty four bit page of the memory can be "write-protected" to prevent erasure. When the information and identity storage device is physically removed from a vehicle, the "write-protected" portion of the memory bank can be reprogrammed for use on a different vehicle without physical alterations. In one embodiment, these "write-protected" bits can be reprogrammed by illuminating a light-activated switch located on the information and identity storage device.

In rail car use, a microwave signal is transmitted and received between the transmitter and receiver. Other radio frequency, optical or inductive communication schemes are feasible. In the case of railroad cars, an interrogation station reads at a distance of up to five meters, but this distance can be increased to several kilometers for different uses, or reduced for other uses. The information and identity storage devices have to be suitably packaged for protection against weather and environmental conditions and have antennas to allow transmission and receipt of coded signals in suitable locations.

The present invention also provides an electronic identification system for remotely storing information on an object, and remotely retrieving information from the object. The electronic identification system includes, in combination, an information and identity storage device located on the object, and at least one interrogation station located remotely from the object. The interrogation station is adapted to read data from the information and identity storage device as well as to program it without physical contact.

The information and identity storage device comprises memory means for storing information and identity data, and protect means for protecting a portion of the memory means against accidental erasure. Logic circuit means for producing a predetermined coded signal representing the information and identity data stored in the memory means has a remote non-contact means for programming the portion of the memory means not protected by the protect means. Transmitter means for transmitting the coded signal is coupled to trigger circuit means which, when triggered, causes the coded signal to be transmitted. A battery power source energizes the other portions of the information and identity storage device.

The interrogation station comprises interrogation signal means for triggering the logic circuit means in the information and identity storage device and pulse sequence generating means for programming the portion of the memory means on the information and identity storage device not protected by the protect means. The interrogation station also has receiver means for receiving the coded signal from the information and identity storage device and synchronization means between the information and identity storage device, and the receiver means. Decoder means for decoding the coded signal, verifies the accuracy of the coded signal, and recovers the information and identity data stored in the memory means of the information and identity storage device and transmitted to the interrogation station.

In other embodiments of the invention, a first antenna is provided in the logic circuit means to pick up an interrogation signal, and a second antenna is adapted to transmit the coded signal from the transmitter means. An absolute time source is provided integral with the information and identity storage device, together with synchronization means between this time source and the receiver means. In another embodiment, the memory means has the ability to store a plurality of pages representing the information and identity data, and the logic circuit means can select data from the plurality of pages upon receipt of predetermined timed interrogation pulses from the interrogation station. In yet a further embodiment, the decoder means verifies the accuracy of the coded signal by including an integral count of the number of zeros in the coded signal.

A light-activated switch integral with the protect means is provided in one embodiment which, when illuminated, permits the portion of the memory means protected by the protect means to be erased and reprogrammed. In a still further embodiment, a wheel contact signal means is provided for use on a railroad car to indicate arrival of each car at the interrogation station.

A particularly important additional embodiment of the vehicular identification system and the equipment disclosed herein is monitoring highway vehicles, motion on multi-lane highways such as toll roads and expressways. In particular, states of the United States have found it necessary to control heavy truck traffic on interstate highways within their borders. In order to effectively maintain traffic control, in particular, it is necessary and desirable to weigh, identify and communicate with vehicles as they traverse bidirectionally on multi-lane highways. In keeping with the present and future highway speed limit, it is necessary to do this at speeds such as 70 m.p.h. Typically, in order to describe the systems disclosed herein, 120 ft./sec. or 72 m.p.h. will be used, although higher speeds can be accommodated at increased data rates. The use of radio frequency signals from the road surface to high speed vehicles, such as trucks travelling along bidirectional multi-lane highways, presents appreciable application difficulties.

As those skilled in the art will recognize, it is necessary to transmit and receive signals from the road surface to each lane of the highway and individually identify each vehicle, although they may be closely spaced, as they travel over a transmitting and receiving antenna located at the highway surface.

The present invention detects vehicles by transmitting an interrogation signal from the road surface to a transponder or information and identity storage unit located on the vehicle, as described herein. In order to protect the transmitting means, such as a radio frequency antenna and/or magnetic loop, shallow grooves are typically cut in the road surface. The loop and/or antenna is placed in the groove and effectively sealed or potted in the groove, thereby restoring the original highway surface. The invention disclosed herein utilizes either low or high radio frequency transmissions from the road surface to the vehicle with high frequency transmissions for the reply. The preferred embodiment uses high frequency electromagnetic transmission in both directions, thereby avoiding the necessity of using loops in each lane of the highway being monitored. A portion of the invention disclosed allows all lanes to be monitored by a single set of antennas traversing them. This approach greatly simplifies installation of antennas, because a single transverse groove formed in the roadway replaces multiple cuts, which otherwise would be needed to install a loop in each monitored lane.

The invention further includes a collinear antenna array operating typically at 915 MHz., used to communicate with vehicles going in opposite directions in multi-lane highways. The use of a multiple element collinear dipole, as those skilled in the antenna arts will readily recognize, is advantageous in that radiation is concentrated at right angles to the array axis. The collinear dipole radiation pattern is oriented with maxima in a radial direction from the array axis. The collinear dipole antenna array provides a relatively constant transverse beam across all lanes of the highway, eliminating the possibility of weak signals at the outer edge of the roadway. The materials used for highway construction have widely varying electrical properties from one geographic region to another. This results in varying amounts of signal attenuation and field pattern distortion for antennas buried in the roadway. In order to provide uniform performance at all locations, it is therefore necessary to electrically isolate the antenna from the roadway and to bury it in a medium of known characteristics. This is achieved by placing the antenna in a conductive channel filled with an epoxy or polyester resin of known dielectric properties. Further, by careful selection of the channel dimensions and dielectric properties, the radiation from the antenna in the upward direction can be maximized. In particular, mounting the antenna array at critical distances with respect to the open side of the channel has provided at least a three decibel signal gain in concentrating the radiation pattern in the direction of the open channel. Use of the dielectric material, in addition to enhancing signal transmission, provides physical protection for the antenna array including the exclusion of water and/or structurally protecting the antenna-radiating surfaces from impact loads due to vehicular tires traversing the groove.

BRIEF DESCRIPTION OF THE DRAWINGS

FIG. 7 is a diagram of the identification system of the invention as installed on a bidirectional, four lane highway, particularly showing the location of individual lane triggering and receiver antennas;

FIG. 8A shows a single lane portion of the four lane highway of the type shown in FIG. 7 having positioned therein a 130 kHz. triggering loop and a 2450 MHz. leaky coax antenna;

FIG. 8B shows another single lane portion of the four lane highway of the type shown in FIG. 7 having positioned therein a 130 kHz. triggering loop antenna and a 915 MHz. collinear array receiving antenna;

FIG. 8C shows a single lane portion of the four lane highway of the type shown in FIG. 7 having positioned therein a 915 MHz. collinear array, triggering pulse transmitting and a 915 MHz. collinear array data receiving antenna;

FIG. 8D shows a single lane portion of the four lane highway of the type shown in FIG. 7 having positioned therein a single 915 MHz. collinear array antenna for interrogation, transponder triggering, and transponder signal receiving through the use of a directional coupler;

FIG. 9C is a graphic depiction of the current distribution in the center conductor of the coaxial cable elements of the array of FIG. 9B;

FIG. 9D is a further graphic depiction of the current distribution in the sheath of the coaxial cable elements of the antenna of FIG. 9B;

FIG. 10 is a sectional view taken substantially along line 10—10 of FIG. 9, showing details of the collinear array antenna and the reflecting shield;

FIG. 10A is a partly sectional view of the collinear array antenna of FIG. 8D, in an operative position showing details of the radiation signal pattern of the collinear array antenna in a direction parallel with the collinear array;

FIG. 10B is an elevational view of the roadway of FIG. 9, showing the pattern of radiated energy from the collinear array antenna and reflecting shield of FIG. 9;

DETAILED DESCRIPTION OF THE PREFERRED EMBODIMENTS

Figure 1:
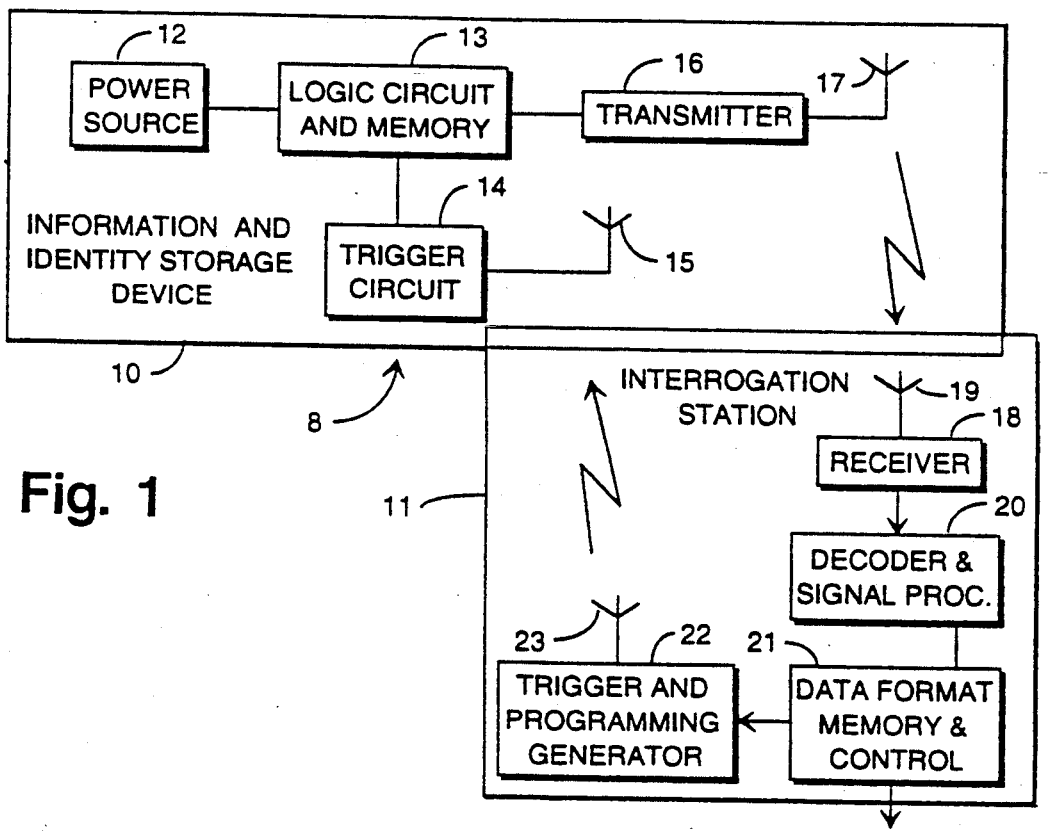
FIG. 1 is a block diagram illustrating an electronic identity system having an information and identity storage device and an interrogation station and embodying the present invention.

Referring now to FIG. 1, an electronic identification system 8 includes a transponder or identification and identity storage device 10 and a fixed transponder or interrogation station 11. The information and identity storage device 10 includes a power source 12, a logic circuit and a memory 13, a receiver and trigger circuit 14 with a first antenna 15, a radio frequency transmitter 16 and a second antenna 17. The interrogation station 11 includes a receiver 18 with an antenna 19 of an antenna array, a decoder 20, a data processor 21, which provides data format memory and control functions, and a trigger interrogation pulse sequence generator and a transmitter 22 with an antenna 23. The data processor 21 aids in the decoding process, formats the data for communication with a central data processing unit (not shown) and generally controls the functions of the interrogation station 11. In general, the complexity of the data processor 21 depends on the particular function which the electronic identification system 8 is required to perform.

The power from the power source 12 for data retention in the memory of the information and identity storage device 10 must be present at all times unless an EEROM is used and so a battery is required. However, the battery could be supplemented by other power sources including energy transfer from inductive or radio frequency energy fields, of which several examples exist in prior art, or inertial field generation as described herein. In many embodiments, of which railroad cars are one example, the power requirements are such that available batteries could provide up to a 20 year operational lifetime without supplemental sources of energy. For those applications where additional energy is required, and where the object requiring data storage is in motion, a means for producing power for data transmission is from the inertial field.

Figure 2:
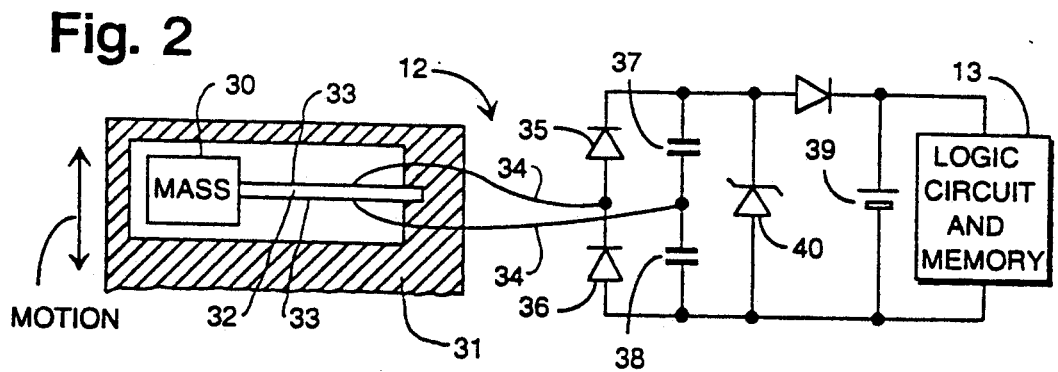
FIG. 2 is a schematic diagram illustrating one embodiment of a vibrationally driven power source for the information and identity storage device of FIG. 1.

FIG. 2 illustrates an inertial energy generator where electric power is derived from the vibration or vertical movement of the moving object. A small mass 30 is shown mounted in a frame 31 on one end of a resilient strip 32. Piezoelectric material 33 is bonded to each side of the strip 32, and a movement of the mass 30, causing deflection of the strip 32, generates an alternating voltage. Leads 34 from the piezoelectric material 33 feed to a circuit where rectification and doubling of the voltage is performed by the diodes 35, 36 and the energy storage capacitors 37, 38. Alternatively, an ordinary full-wave or half-wave rectifier may be used if the higher voltage is not required. The direct current energy either can be stored in the capacitors 37, 38 or in a rechargeable battery 39. A means for limiting the maximum voltage is provided in the form of a Zener diode 40, by a number of diodes in series, or by a voltage regulator circuit.

The contents of the memory are maintained by the battery power source 12 which provides sufficient energy to the transmitter 16 so that the coded signal is completely transmitted before the stored power drops low enough to stop the data transmission. The transmitter 16 draws little power from the power source 12, in its quiescent state, allowing excess generated energy form the power source 12 to be stored for later transmission. The data to be transmitted from the information and identity storage device 10 must be formatted in such a way that the desired information is conveyed accurately. While the following scheme is the preferred embodiment for marking railroad cars, a number of variations are possible. In general, the data will contain coded information to designate the owner of the car and the car's serial number in a protected portion of the memory.

Data bits can be coded in various ways. For North American railroad applications, where cars associated with various owners are intermixed, a code is allocated to the protected portion of the memory frame as follows:

9 bits: represent car owner
20 bits: represent car serial number
5 bits: are used as a check
(0 count)

The data code stream contains either a means of self-synchronization relying on the code format, or an external or inherent method of synchronization is provided. In one embodiment, synchronization in some form is provided at the interrogation station 11 to clock the identification device 10. An alternative solution is to provide an absolute time source such as a clock, with the identification device 10. The clock should be stable enough so that synchronization of the second independent clock in the interrogation station 11 is maintained within a single bit interval for the period of time required to transmit the coded signal from the moving information and identity storage device 10 to the stationary interrogation station 11. The availability of low cost, accurate timing crystals for wristwatch manufacture make the use of a non-return to zero (NRZ) code feasible for the code signal since the timing is predictable enough for data recovery. The low power consumption of these devices allows lifetimes of up to 20 years on available batteries.

One operating feature of the information and identity storage device 10 is the code rate employed for the coded signal. High code rates allow for many read operations at high vehicle speeds, but are more difficult to decode and consume more power. Typical microwave antennas allow a reading window of about 300 meters. A transmitter spends about 3.5 milliseconds in this window when traveling at 320 km./hr. Assuming at least three transmissions to be received, the total time for each transmission would be about one millisecond. A typical transmission comprises eight preamble bits and sixty four data bits so that a sufficient code rate is about 64 kHz. Doubling the frequency of a watch crystal provides a convenient rate of 65.5 kHz. with acceptably low power. At more common railroad and highway speeds such as 100 km./hr., the transmitter can be read approximately ten times with consequent improvement in accuracy. In order to read four sixty four bit pages of data, or two hundred fifty six bits three times in less than 3.5 milliseconds, the maximum transponder carrying vehicle speed is 80 km./hr., which is more than adequate for those locations at which this quantity of information is required. With this code rate, spacing of information and identity storage devices 10 on adjacent railway cars can be of the order of a meter without any difficulty.

Increased data rates for use with high speed vehicles or vehicles traveling multiple lane roadways or tracks can be provided by the transponder 10 and interrogator or reader 11 disclosed herein, and will be later described.

Figure 3:
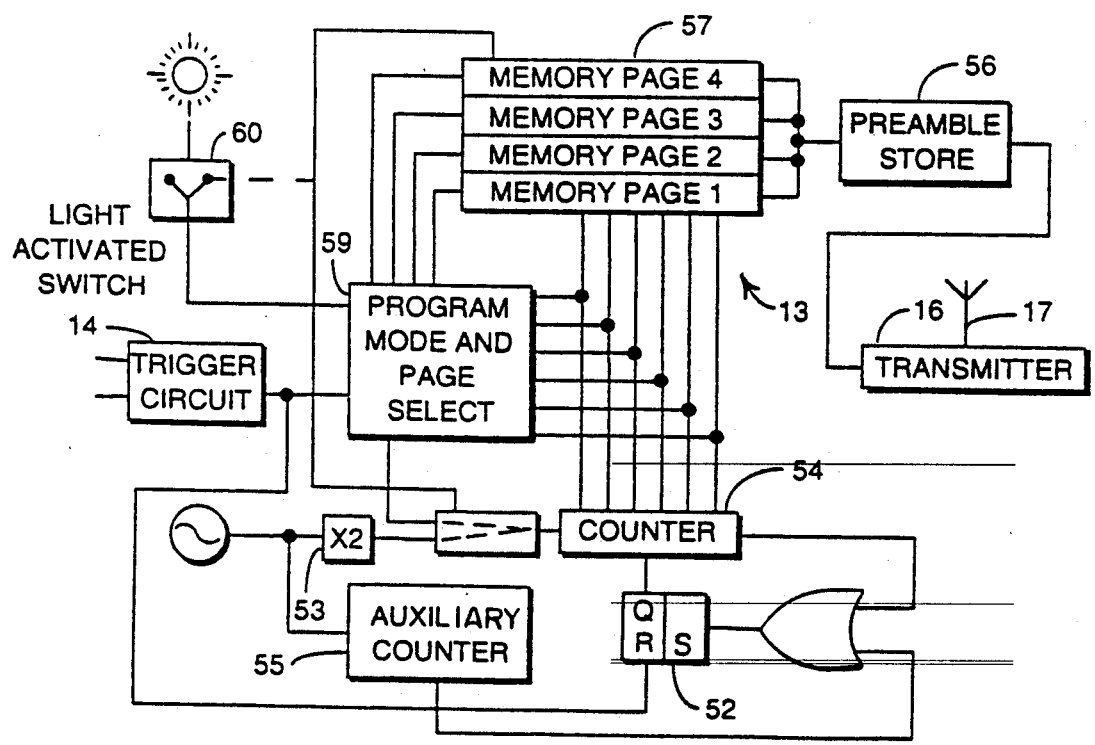
FIG. 3 is a block diagram of a logic circuit in the information and identity storage device of FIG. 1.

A block diagram of the logic circuit 13 is shown in FIG. 3. The logic circuit 13 will be familiar to those skilled in the art. To achieve the very low current consumption required, the entire information and identity storage device 10 is realized in a single CMOS integrated circuit or circuits. In response to a trigger impulse, the trigger circuit 14 resets the flip-flop 52 and the counters 53 and 54 and auxiliary counter 55 are allowed to count. Counter 54 sequentially selects memory addresses which cause the contents of the preamble store 56 and the first memory page 57 to be output through the transmitter 16 to the antenna 17, which consequentially sends out a coded signal. At various precise time points during the transmission, the program mode and page select circuit 59 allows memory paging or programming mode entry. Access to the first thirty four bits is controlled by the light-activated switch 60. Data entry is also through the trigger circuit 14. The information and identity storage device 10 is returned to its quiescent state either when counter 54 reaches the end of its count, signifying that all bits have been sent, or when auxiliary counter 55 ends its count.

The trigger circuit 14 may take one of several forms depending on the specific application. The characteristics of the trigger circuit 14 are as follows:
1. High input impedance.
2. A threshold level of voltage which must be exceeded in order to initiate the transmission.
3. Trigger initiation is effected by an impulse rather than a steady state condition.
4. The trigger circuit is passive in the sense that its operational power is obtained from the triggering signal and it consumes no energy in the quiescent state.

Figure 4:
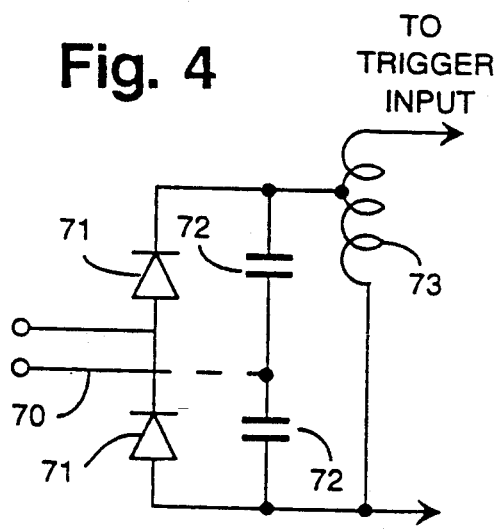
FIG. 4 is a schematic diagram of a microwave triggered circuit of the information and identity storage device of FIG. 1.

Energy may be provided to trigger circuit 14 in various forms such as electromagnetic, magnetic, infrared, ultrasonic or pressure. In one embodiment used in the railroad environment, a burst of microwave energy is used as an interrogation signal. FIG. 4 shows a trigger circuit suitable for receiving an interrogation signal 70 in the form of electromagnetic radiation, demodulating the burst with diodes 71 and capacitors 72 and matching the appropriate input impedance with a pulse transformer 73.

In order to access the additional pages of memory, a timed sequence of interrogation pulses is sent. A different sequence of pulses allows the memory to be written to, this access only being permitted to "write protected" portions of memory unless the protect switch is illuminated. The individual bits of memory are also programmed using appropriately timed interrogation pulses.

Included in the information and identity storage device or transponder 10 are two antennas 15 and 17. These could take various forms but in one embodiment, they operate at microwave frequencies. Both antennas 15 and 17 and also all other circuitry in the device are mounted on a sheet of low loss material. The antennas may consist of patches or arrays of patches of conductive material whose design would be familiar with ones skilled in the art. The configuration of the patches is dependent on the frequency of operation and the desired antenna patterns. One antenna is associated with the trigger circuit 14 described above, and the other is connected to the transmitter 16, which is a single stage device arranged to produce energy at the desired frequency. A power output of one to ten milliwatts is more than sufficient for reliable operation of the electronic identification system 8. In general, the operating frequencies of the data link and the triggering link are different, but since the trigger circuit and the data circuit do not transmit at the same time, they may be the same.

Figure 5:
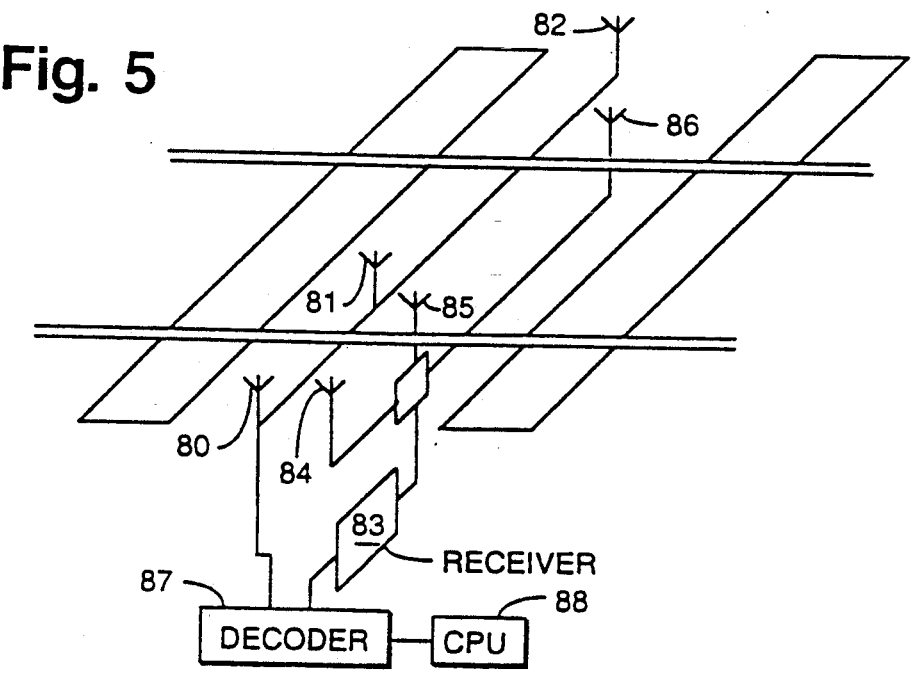
FIG. 5 is a block diagram of the interrogation station of FIG. 1.
Figure 6:
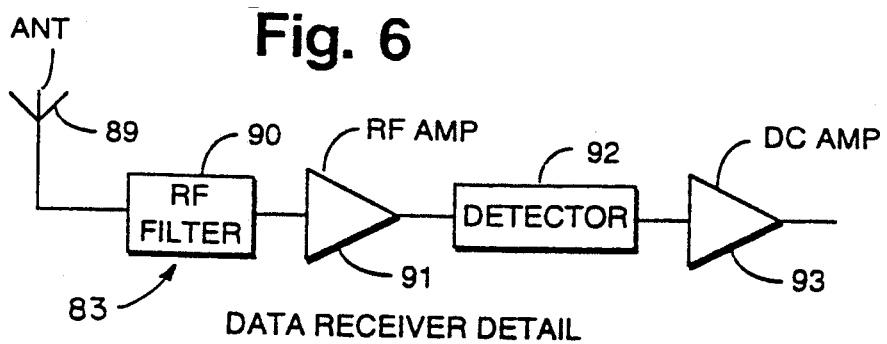
FIG. 6 is a block diagram showing the coded signal receiver of the interrogation station of FIG. 5.

FIG. 5 illustrates a more detailed arrangement of the interrogation station 11. The embodiment shown represents one configuration suitable for railroad applications. Alternative interrogation stations and receiving antennas may be employed. Three microwave interrogator signal sources with antennas 80, 81 and 82 are shown. One is located on each side and one between the two ties of the railroad track to allow reading of the information and identity storage devices on either side or under the cars. A coded signal receiver 83, which is similar to the receiver 18, with antennas 84, 85 and 86 on either side in between the tracks is located beside the track along with the rest of the interrogation equipment 87, 88. The receiver 83 is shown in more detail in FIG. 6 and has an antenna 89, an RF filter 90, RF amplifier 91, a detector 92, and a DC amplifier 93. The operating frequency is chosen to minimize noise and unwanted signals and is typically in the 2500 MHz region although other frequencies such as 915 MHz. can be used as well. Detected and amplified signals from the receiver 83 are fed to the decoder 87 and microprocessor system 88 where they are checked for accuracy and stored or transmitted to a host computer as required. Synchronization with the transmitter 16 takes place in the decoder circuit 86 which has an absolute time reference on the same frequency as the transmitter 16.

In one embodiment of the system, wheel contacts provide supplemental information such as speed and direction of the train. Wheel contacts indicate when the whole train has passed, and at this time the data is assembled in a format compatible with the central data processor to which it is sent either in response to an interrogation or on its own request. It is also possible to use reflected signals from the interrogating beam to determine the speed and direction of the vehicle using the Doppler effect.

As indicated earlier and above, the electronic vehicular identification system 8 disclosed herein may also be used to identify moving vehicles on multi-lane highways, however, substantial difficulty may be encountered due to random arrival of vehicles at the reading or interrogating station 11, and in particular, movement of the vehicle's transponder 10 over an interrogating loop or antenna. Since there is a high probability that multi-vehicle traffic will be simultaneously present at the interrogating antenna location, in order to properly monitor road traffic at a given point, it is necessary to distinguish not only between successive vehicles in a given lane, but to distinguish the particular lane occupied by a given vehicle that passes over the interrogation antenna. In order to provide the type of roadway monitoring currently required by state highway authorities, the present invention provides an apparatus and a method which provide positive identification of vehicles travelling in the same and opposite directions along multi-lane highways. Typically, in a given monitoring situation two to four lanes are monitored with identification of vehicles having a nominal transponder spacing of 3 feet traveling at typical speeds of 70 m.p.h. As will be discussed, however, vehicle speed and transponder spacing can be varied through the use of greater data rates.

Figure 12:
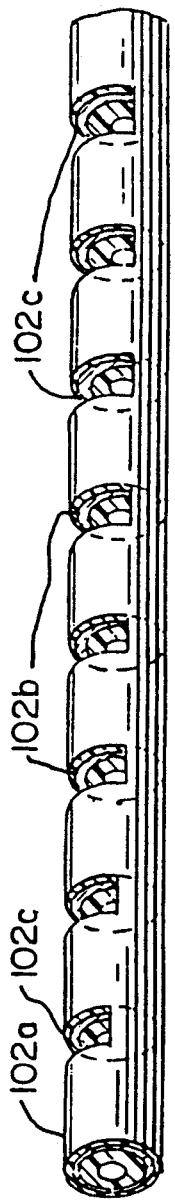
FIG. 12 is an isometric view of one form of a leaky coax radiating element.

In particular, with reference to FIGS. 7 and 8A through 8D, various single lane embodiments of the highway signal transmitting and receiving systems of the invention are shown therein. FIG. 7 shows in diagrammatic form, a typical multi-lane highway installation wherein four lanes of opposing direction traffic 101 and 103 travel along a highway 109. In the specific lane configuration of FIG. 8A, there is buried in the surface of the roadway, a collinear triggering antenna or alternately a triggering loop antenna 100 typically radiating at a frequency of 130 kHz., and a collinear antenna array 102, radiating or receiving at a frequency of 2450 MHz. The collinear antenna array 102 will be known to those skilled in the art as leaky coax, as disclosed in U.S. Pat. No. 3,691,488, the disclosure of which is incorporated herein by reference. It comprises a coaxial cable 102a, as may best be seen in FIG. 12, having a perforated outer conductor 102b for radiation of electromagnetic energy through a plurality of openings 102c therein.

Systems using a loop trigger antenna and microwave collinear antenna can also operate the loop at 130 kHz., with microwave collinear receiving antenna 102 operating at 915 MHz. and other collinear antenna arrays as shown in FIGS. 8A, 8B, 8C, and 8D. FIGS. 10A, and 10B show the signal intensity of radiation pattern of the operating collinear array antenna 102. As shown, the signal intensity pattern defines a transponder capture zone.

The system of FIG. 7 utilizes individual lane triggering antennas 100, and receiving antennas 102, as will be discussed later.

Although the following description is framed on the loop trigger operating antenna configuration of FIGS. 7, 8A, and 8B, the lane configurations of 8C, or 8D would function equally as well, and are considered equivalent systems.

Figure 11:
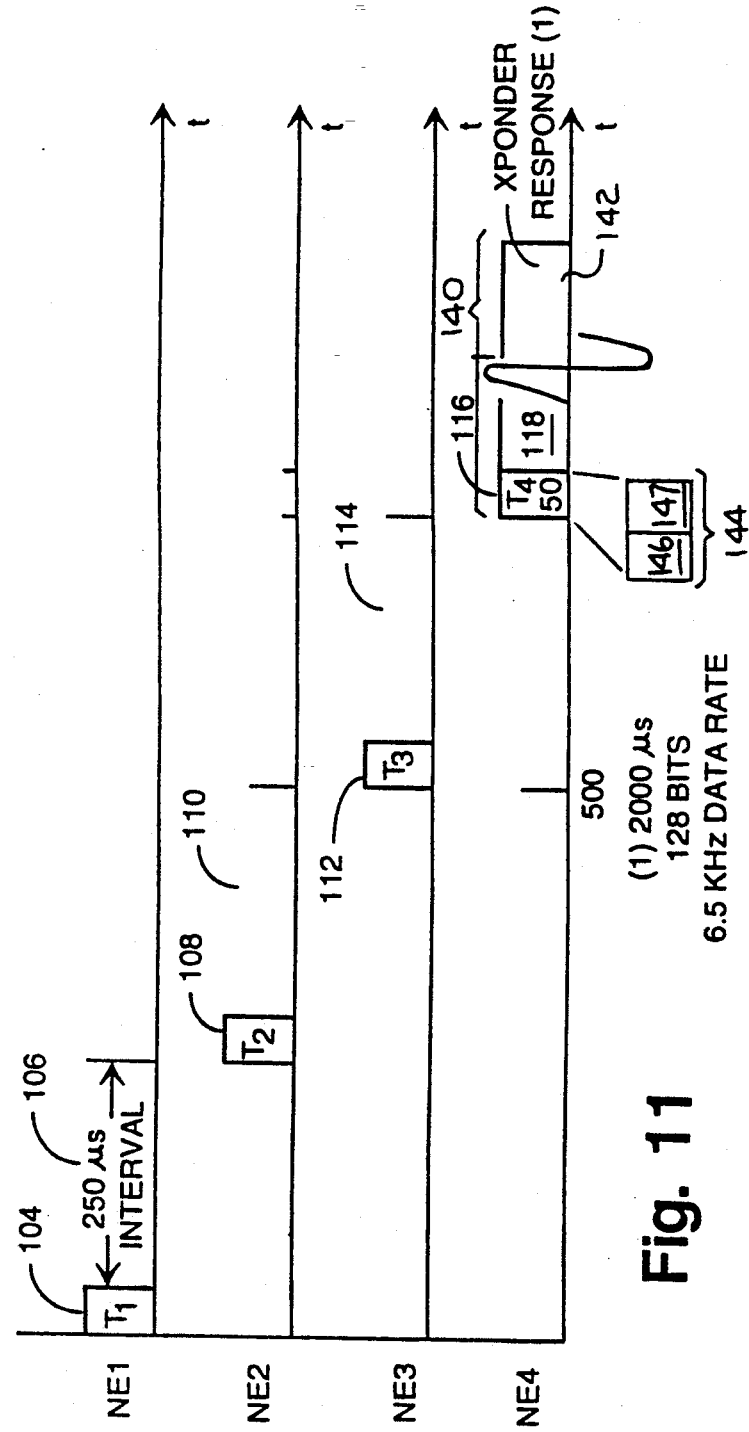
FIG. 11 is a diagrammatic representation of the sequence of triggering and data pulses transmitted and received by an interrogation station positioned adjacent a fourth lane of a four lane highway.

In operation, and with inclusive reference to FIGS. 7 and 11, there is a transponder interrogating or triggering pulse 104 transmitted by a triggering antenna or loop 100. After a transponder response interval 106, typically 250 microseconds, if no transponder response is received by the antenna 102, interrogator or reader 105 (FIG. 7) stores the non-response indicating an interrogating transmission on lane 1. The second interrogating pulse 108, noted as lane 2, is transmitted from the antenna 100, and if no transponder response is received during the interval 110, a third interrogator pulse 112, noted as lane 3, is transmitted with an additional wait for a receiving period 114. As shown, the fourth interrogating pulse 116, noted as lane 4, is transmitted and receives a transponder response 118. On receipt of the transponder response, the transmitted interrogating pulse is delayed by 2,000 microseconds in order to provide additional time to receive a transponder message, typically containing 128 information bits, at a data rate of 65 kHz.

The "record keeping" i.e., lane counting, and redundant reads in the case of improper data reception is under the control of an interrogator 105. This approach provides successful monitoring for moving vehicles in multi-lane roadways. The electronic identification system 8 operates under conditions wherein there is a nominal spacing between transponders 10 in any lane configuration on vehicles moving at rates of 120 feet per second, or 72 m.p.h. The invention further provides an antenna having a transponder capture or zone of approximately three feet along the path of the moving vehicle. With this configuration, information data rates of 65 kHz. and vehicle speeds, each lane's capture zone is occupied by a given vehicular transponder for at least 30 milliseconds. At the above-mentioned data rate of 65 kHz., a 128 bit message received from the transponder can be received in approximately two milliseconds, providing a large time interval where multiple reads of the same transponder 10 can be obtained in order to improve the statistical return signal accuracy.

In another particular embodiment of the invention, a leaky coax antenna is operated at a frequency of 2450 MHz. However, as will be further described, the use of available lower frequencies, typically 915 MHz. for both triggering and data transfer from the data transponder 10 allows read intervals adequate to insure accurate detection and identification of the moving vehicles.

Although the above described system operates at a data rate of 65 kHz. or kilobits per second, and a carrier frequency of 915 MHz., this invention discloses the discovery that equivalent operation can be achieved at data rates of 500 kHz. or kilobits per second. This provides a relatively large increase in the effective capture zone of the particular collinear antenna configuration shown in FIGS. 10A and 10B, thereby allowing vehicular speeds in the vicinity of 100 m.p.h., and more importantly provides a system capability of multiple transponder read cycles for essentially simultaneous occupancy of a multiple lane highway by vehicles which may be moving in either direction.

In addition, it has been discovered, that the use of individual lane receiving antennas of the type shown in FIG. 7 greatly simplifies the correlation of vehicular identification with a specific lane. The 500 kHz. or kilobits per second data rate therefore allows the use of a 600 microsecond transponder read cycle comprised of an initial 50 microsecond transponder triggering pulse, followed by a 550 microsecond transponder receive interval. In addition the higher data rate allows for transponder reprogramming during the transponder response time portion of the cycle.

FIG. 7 further shows an interrogator or reader 105 in signal communication with an antenna or loop 100 and the antenna 102. This arrangement is common to roadway interrogating stations disclosed, providing communication and information processing between road antennae, and auxiliary computing equipment.

In an additional embodiment of the invention, the lane configuration of FIG. 8B consists of interrogator trigger loop alternate 120, which is similar to the loop 100 discussed above, for delivering a trigger or turn-on pulse at 130 kHz. Also used, as may best be seen in FIGS. 8B and 11, is a collinear antenna array 122 utilized as an antenna for receiving a transponder signal 118 during the transponder response interval 106 to the triggering pulse 116 transmitted by the loop 120. Use of the collinear antenna array 122, provides an advance in the art of transponder communication, in that receiving signal strength from the transponder 10 is greatly improved.

With reference to FIG. 8C, yet an additional embodiment of the invention comprises parallel collinear array antennas for transmitting a trigger pulse from one array and interrogating a mobile transceiver 10 and receiving the transponder signal from the other. The configuration of FIG. 8C is placed in and substituted for the loop 100 and collinear antenna 102 of FIG. 7. Replacement of the interrogating loops 100 and/or 120 by a collinear transmitter array 122 provides an advantage in that the antenna 122 provides signal gain and directivity from the interrogation station 11 to the transponder 10 for transmitting trigger pulses to, in reprogramming the transponder 10. Similarly, the collinear array receiving antenna 122 provides increased directivity and signal gain for data received from the low power transponder 10.

A further embodiment of the invention disclosed herein is shown in the individual lane element of FIG. 8D. As shown, a single collinear array operating at 915 MHz is used for both transmitting and receiving with the use of a microwave directional coupler or circulator 126 wherein the triggering and interrogation signal is supplied by a conductor 127 and transponder response signals are received via the coupler and connector 128. This configuration is a further advance in the art of identifying and communication with moving vehicles in that only a single roadway groove is required.

The use of 915 MHz. as a communication frequency for the electronic identification system is dictated by the availability of this frequency for devices of this type. As such, it is a reasonable compromise with respect to interference from other services and devices, debris penetration, and availability of components at reasonable cost.

As discussed above, the collinear array suitable for installation in the roadway surface has provided signal directivity and gain in the direction upwards of the road surface. In particular, as may best be seen in FIGS. 9 and 10, the antenna consists of the collinear array assembly 122 consisting of a collinear element array 124, as may best be seen in FIG. 9A, mounted internally of a U-shaped open channel or shell comprising a reflective shield 123. An antenna array 124 comprised of coaxial cable is mounted in the channel 123 inside a protective tubular housing 128 mounted somewhat centrally and internal of the reflective shield 123. Surrounding the outer surfaces of the tubular housing 128, is a dielectric material 130 filling the reflective shield. The use of a material having a dielectric constant greater than 1.0 and high compressive strength, water resistance, and the ability to bond to both the reflective shield 123 and the housing 128, improves signal transmission by increasing the signal strength above the roadway, and provides protection from the vehicles on the road.

Figure 9:
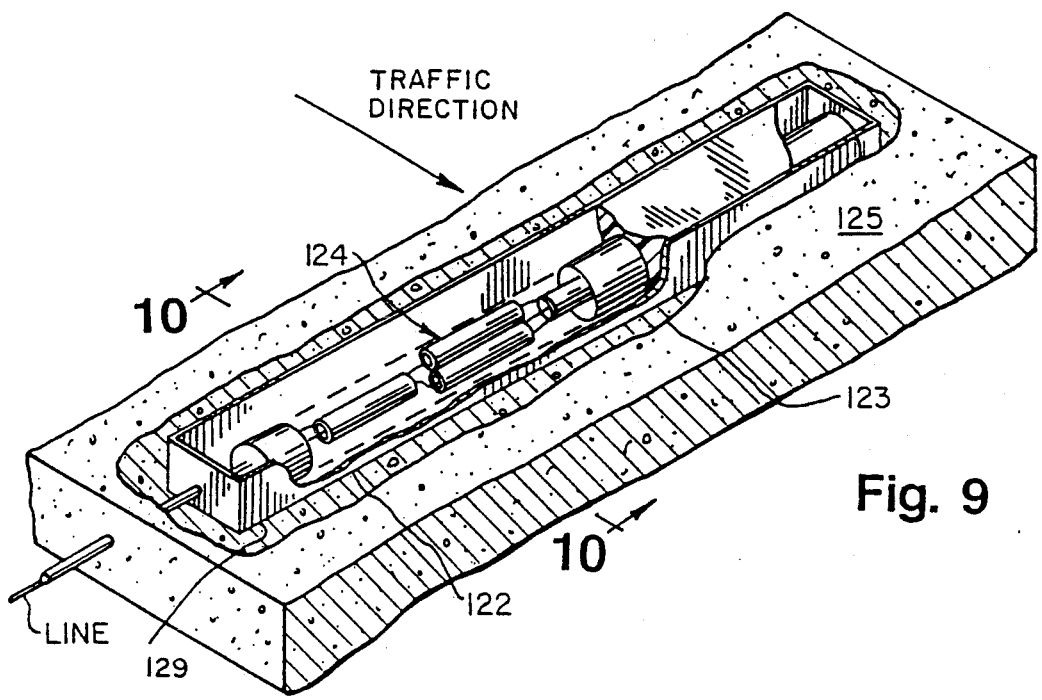
FIG. 9 is an isometric view of the antenna and a reflective shield or channel housing embodying the present invention, showing details of the positioning of the channel in a roadway of a highway and the position of the antenna in the channel.
Figure 9A:
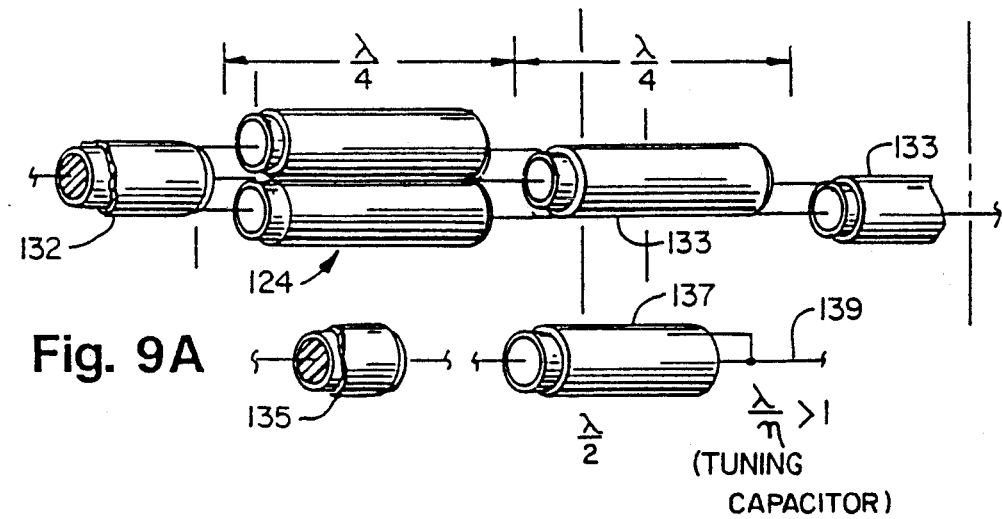
FIG. 9A is an isometric view of the collinear array antenna of FIG. 9, showing further details of its construction.
Figure 9B:
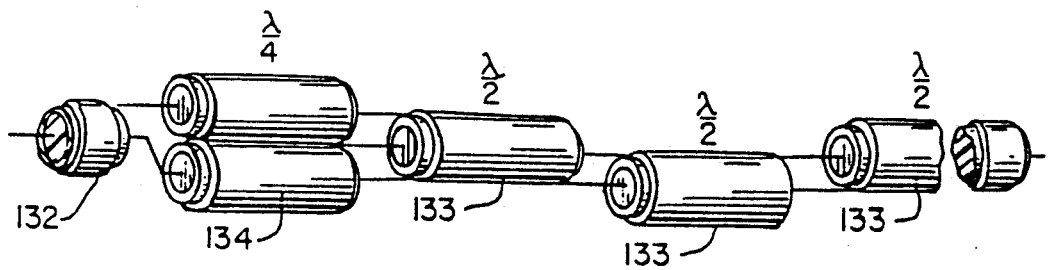
FIG. 9B is an additional depiction of a portion of the collinear array of FIG. 9A, showing two complete elements and a partial element constructed from coaxial cable.

As those skilled in the antenna arts will readily recognize, use of relatively low loss dielectric materials having dielectric constants greater than 1 reduces the wavelengths of electromagnetic transmissions through the medium. In this case use of the material having a dielectric constant of approximately 2.5 tends to reduce the wavelength of the transmitted signal by a factor of about 1.5. The effect of this wavelength reduction is to effectively bring the antenna to shield or trough distance closer to a half wavelength at 915 MHz., thereby increasing the effectiveness of the shield in reflecting radiation toward its open end thereby increasing the signal strength of upward radiation. As shown in FIG. 10, the antenna array 124 is laterally centered closer to the road surface 125 than the bottom of the metal shield 123, substantially increasing the radiated signal upwards through the shield open end and upward from the road surface 125. The disclosed antenna further provides an advantage in that the reflective shield 123 eliminates any dependence on the dielectric constant or radio frequency characteristics of commonly used pavements, resulting in predictable performance in roadways having highly variable radio frequency loss characteristics. In a specific embodiment of the invention, the reflective channel of FIG. 10 comprises a metal shield having a three-inch width, with the collinear antenna assembly 124 disposed equidistant from the sides of the shield 123 and approximately one inch from the lower surface. The channel is cemented or retained in a roadway groove, after which the antenna assembly properly supported from one edge of the road to the other is, "potted" with dielectric material 130 in the metal shield 123, as shown in FIGS. 9 and 10.

The improvement in radiating signal characteristics of the collinear array disclosed herein is particularly shown in FIGS. 10A and 10B. In providing a relatively uniform radiation pattern across the roadway shown in FIG. 10A, provides improved responses from vehicular transponders 10 operating near the edge of the road. The radiation pattern, or transponder zone capture of the antenna shown in FIG. 10B increases the occupancy time of moving transponders providing, as discussed above, an improved accuracy in data transfer from low power transponders to interrogator.

In reference to FIG. 9A, 9B, 9C, and 9D there is shown a detailed depiction of a typical portion of the collinear array 124. As those skilled in the antenna arts will readily perceive, one embodiment utilizes lengths of coaxial cable cut to one-half wavelength at the operating frequency and connected conductor-to-shell, as shown, in order to obtain the required phase reversal in each other half-wave section, resulting in a plurality of in-phase radiating elements which increases the radiated signal strength over that provided by an identical number of dipoles. A unique advantage of the collinear array 124, as incorporated in a road antenna in this invention, lies in its completely modular construction. It is possible to utilize this antenna construction in identifying vehicles over roads having varying widths and numbers of lanes by merely adding additional half-wave sections.

The theory and operation of the collinear array antenna of the invention are described in *Transmission Lines, Antennas, & Wave Guides*, King, Mimno & Wing, McGraw-Hill Book Co., pp. 133–145.

At the input end 132 of the antenna assembly 124, there is shown a quarter-wave matching stub 134. Also at the free end of the antenna 135, there is an additional quarter-wave matching stub 137 having an additional capacitive end 139. Those skilled in the art will readily understand applicant's discovery of a collinear array in cooperation with a reflecting shield providing an advance in the state of the art of vehicle identification through transmission and reception of radio frequency signals to and from the road surface.

A further portion of the invention disclosed, as may best be seen in FIG. 11, in addition to reading a vehicle mounted transponder in order to record and store its fixed identification, the reader or interrogator 105 can communicate with the moving vehicle by transmitting a data signal pulse to the transponders 10.

As discussed above, individual transponders 10 are activated by a trigger pulse, i.e., pulses 104, 108, 112 and 116 as may best be seen in FIG. 11. Because the transponder trigger circuit 14 is activated by the trigger pulse, coding the trigger pulse from the interrogation station 11 at a data rate substantially higher than the transponder data rate to the interrogation station 11 provides a means for supplying data to the moving vehicle. Accordingly, in this embodiment of the invention the interrogator-transponder signal 140 comprises a transponder response 142 having a time duration of 2 milliseconds at a data rate of 65 kHz. The triggering signal 144, transmitted from the interrogation station 105 comprises a 25 microsecond coded portion 146 at a data rate of 1 MHz and a 25 microsecond pulse 147. Typically, this information would appear or be available on the moving vehicle via a dashboard display. Those skilled in the art will understand this dashboard display can take many forms including gas discharge displays and/or onboard cathode ray tube monitors. Information transmitted in this manner typically can be road conditions emergency information for driver reaction or changing speed limits.

Although the embodiment described herein has been specifically described as being suitable for highway and railroad use, it will be apparent to those skilled in the art, that the system has many applications and various changes may be made to the circuits and elements described herein without departing from the scope of the present invention which is limited only by the following claims.

What is claimed is:

1. An apparatus for communicating with a transponder carried by a vehicle moving along a multi-lane roadway, comprising:

transmitter means for producing a triggering signal;

an antenna system coupled to said transmitter means and having a portion driven by said triggering signal to produce a triggering electromagnetic field, said antenna system being embedded in said multi-lane roadway, said triggering electromagnetic field defining a localized transponder capture zone along said multi-lane roadway and substantially confined to one lane of said multi-lane roadway, said triggering electromagnetic field being radiated by said portion of said antenna system for a trigger time interval for exciting a transponder within said localized transponder capture zone;

a transponder carried by a vehicle in said one lane, said transponder being responsive to said triggering electromagnetic field for transmitting transponder response signals incorporating data related to the identity of the vehicle;

a receiver coupled to said antenna system for monitoring transponder response electrical signals from said antenna system during a transponder response time interval following said trigger time interval, said trigger time interval and said transponder response time interval defining a transponder read interval; and means responsive to said transponder response signals for associating said received transponder response signals with said one lane of said multi-lane roadway.

2. An apparatus as defined in claim 1, wherein said transponder response time interval is of sufficient duration to allow transponder response signals incorporating the vehicle identity data to be transmitted three times.

3. An apparatus as defined in claim 1, further comprising means for modulating said triggering signal to carry coded information to be received by the transponder.

4. An apparatus as defined in claim 1, wherein said antenna system comprises a collinear antenna array having a lengthwise substantially uniform signal distribution, said collinear antenna array being aligned essentially perpendicular to a direction of travel of the vehicle along said roadway.

5. An apparatus as defined in claim 4, wherein said collinear antenna array comprises a leaky coax antenna.

6. An apparatus as defined in claim 4, further comprising a microwave circulator connected intermediate said transmitter and said collinear antenna array, said microwave circulator cyclically controlling said transponder response cycles by conducting triggering pulses from said transmitter to said collinear antenna array for radiation of said triggering signals to said transponder and by receiving transponder signals from said collinear antenna array.

7. An apparatus as defined in claim 4, wherein said antenna system further comprises a triggering loop embedded in the roadway for radiating said trigger signals.

8. An apparatus as defined in claim 1, wherein said antenna system further comprises:

a first collinear antenna array driven by said transmitting means, said first collinear antenna array radiating said trigger pulses which are to be received by an information and identify storage device carried on the vehicle; and a second collinear antenna array for receiving signals from the information and identity storage device.

9. An apparatus as defined in claim 8, wherein said first and second collinear arrays comprise a leaky coax antenna.

10. An apparatus in accordance with claim 1 wherein said associated means responds to the receipt by said antenna system of said transponder response signals within said transponder response time following said triggering electromagnetic field signal for associating said one lane to which the triggering electromagnetic field is confined with the identity of the vehicle incorporated by said transponder response signal.

11. A fixed roadway communication station for communication with a transponder associated with a moving vehicle, comprising:

a transmitting means for transmitting interrogation signals;

a mobile transponder associated with a moving vehicle and responsive to said interrogation signals for transmitting electromagnetic radiation;

a reflector shield for positioning in a roadway for receiving said electromagnetic radiation from said mobile transponder;

a collinear antenna array positioned within said reflector shield to receive said electromagnetic radiation received by said reflector shield; and a receiver coupled to said collinear antenna array to receive electrical energy induced in said collinear antenna array by said electromagnetic radiation.

12. A fixed roadway communication station for communication with a transponder associated with a moving vehicle as defined in claim 11, further comprising means coupling said transmitting means to said collinear antenna array.

13. An antenna system for flush and recessed mounting in a roadway for radiating electromagnetic waves to and receiving electromagnetic waves from vehicles traveling on said roadway, comprising:

an electromagnetic wave reflector having a terminal portion defining a radiation emitting aperture, said electromagnetic wave reflector being buried in a roadway with said terminal portion being positioned substantially flush with a vehicle carrying surface of said roadway; and a radio antenna positioned within and substantially surrounded by said reflector so that said radio antenna is electrically isolated from said roadway and experiences substantially no loss of electromagnetic waves to said roadway, substantially all of said electromagnetic waves radiated from said radio antenna being radiated from said radiation emitting aperture.

14. An antenna system for flush and recessed mounting in a roadway for radiating electromagnetic waves to and receiving electromagnetic waves from vehicles traveling on said roadway as defined in claim 13, further comprising a solid dielectric positioned within said reflector between said antenna and reflector.

15. An antenna system for flush and recessed mounting in a roadway for radiating electromagnetic waves to and receiving electromagnetic waves from vehicles traveling on said roadway as defined in claim 13, wherein said radio antenna comprises a coaxial cable.

16. An antenna system for flush and recessed mounting in a roadway for radiating electromagnetic waves to and receiving electromagnetic waves from vehicles traveling on said roadway as defined in claim 13, wherein said radio antenna comprises a collinear array antenna.

17. An antenna system for flush and recessed mounting in a roadway for radiating electromagnetic waves to and receiving electromagnetic waves from vehicles traveling on said roadway as defined in claim 13, wherein said reflector comprises a substantially rectangular cross section trough.

18. An antenna system for flush and recessed mounting in a roadway for radiating electromagnetic waves to and receiving electromagnetic waves from vehicles traveling on said roadway as defined in claim 13, wherein said reflector is filled with a solid dielectric.

19. An antenna system for flush and recessed mounting in a roadway for radiating electromagnetic waves to and receiving electromagnetic waves from vehicles traveling on said roadway as defined in claim 18, wherein said radio antenna comprises a collinear array antenna.

20. An antenna system for flush and recessed mounting in a roadway for radiating electromagnetic waves to and receiving electromagnetic waves from vehicles traveling on said roadway as defined in claim 18, wherein said radio antenna comprises a coaxial cable.

21. An antenna system for flush and recessed mounting in a roadway for radiating electromagnetic waves to and receiving electromagnetic waves from vehicles traveling on said roadway as defined in claim 13, wherein said radio antenna further comprises a loop antenna.

22. A method for communicating with a moving vehicle travelling in one lane of a multi-lane roadway, comprising the steps of:

producing a first triggering electromagnetic field having a field strength defining a first transponder capture region limited to a first lane of the multi-lane roadway;

producing a first return signal by said vehicle in response to said first triggering electromagnetic field;

first monitoring a frequency of a first return information signal during a first information interval;

producing a second triggering electromagnetic field having a field strength defining a second transponder capture region limited to a second lane of multi-line roadway;

second monitoring a frequency of a second return information signal during a second information interval, different from said first information; and determining that said one lane travelled by said vehicle is said first lane, when said first monitoring step receives said first return signal during said first information interval.

* * * * *

UNITED STATES PATENT AND TRADEMARK OFFICE
CERTIFICATE OF CORRECTION

PATENT NO. : 5,164,732

DATED : November 17, 1992

INVENTOR(S) : Brockelsby et al.

It is certified that error appears in the above-identified patent and that said Letters Patent is hereby corrected as shown below:

At column 1, line 14, change "4,870,491" to --4,870,419--.

At column 3, line 23, after "consumption" insert --.-- (period).

At column 4, line 52, change "vehicles" to --vehicles'--.

Signed and Sealed this

Twenty-eighth Day of December, 1993

Attest:

BRUCE LEHMAN

Attesting Officer     Commissioner of Patents and Trademarks